United States Patent
Han et al.

(10) Patent No.: US 10,692,065 B2
(45) Date of Patent: Jun. 23, 2020

(54) USING A MIXTURE MODEL TO GENERATE SIMULATED TRANSACTION INFORMATION

(71) Applicant: Accenture Global Solutions Limited, Dublin (IE)

(72) Inventors: Jingguang Han, Dublin (IE); Jadran Sirotkovic, Dublin (IE); Dadong Wan, Palatine, IL (US); Xin Zuo, Lucan (IE)

(73) Assignee: Accenture Global Solutions Limited, Dublin (IE)

( * ) Notice: Subject to any disclaimer, the term of this patent is extended or adjusted under 35 U.S.C. 154(b) by 407 days.

(21) Appl. No.: 15/626,795

(22) Filed: Jun. 19, 2017

(65) Prior Publication Data

US 2018/0365674 A1 Dec. 20, 2018

(51) Int. Cl.

| | |
|---|---|
| *G06Q 20/00* | (2012.01) |
| *G06Q 20/22* | (2012.01) |
| *G06N 7/00* | (2006.01) |
| *G06N 7/06* | (2006.01) |
| *G06N 7/04* | (2006.01) |
| *G06Q 30/06* | (2012.01) |
| *G06Q 40/00* | (2012.01) |
| *G06Q 30/02* | (2012.01) |
| *G06F 30/20* | (2020.01) |

(52) U.S. Cl.
CPC .............. *G06Q 20/22* (2013.01); *G06F 30/20* (2020.01); *G06N 7/005* (2013.01); *G06N 7/04* (2013.01); *G06N 7/06* (2013.01); *G06Q 30/0201* (2013.01); *G06Q 30/06* (2013.01); *G06Q 40/00* (2013.01)

(58) Field of Classification Search
None
See application file for complete search history.

(56) References Cited

U.S. PATENT DOCUMENTS

| 5,136,686 | A | * | 8/1992 | Koza | G06N 3/126 |
| | | | | | 706/13 |
| 5,659,593 | A | * | 8/1997 | Tzvieli | H04M 3/22 |
| | | | | | 370/244 |
| 5,841,946 | A | * | 11/1998 | Naito | G06F 17/10 |
| | | | | | 706/62 |

(Continued)

FOREIGN PATENT DOCUMENTS

| EP | 1178416 A1 | 2/2002 |
| WO | 2014/130748 A1 | 8/2014 |

OTHER PUBLICATIONS

Extended European Search Report corresponding to EP 18178232.7, dated Aug. 13, 2018, 7 pages.

*Primary Examiner* — Gurkanwaljit Singh
(74) *Attorney, Agent, or Firm* — Harrity & Harrity, LLP

(57) ABSTRACT

A device may obtain, for a set of transactions, a set of transaction values associated with a particular industry. The device may determine one or more sample statistical distributions for a probabilistic transaction model by using one or more machine learning techniques. The one or more sample statistical distributions may be similar to one or more actual statistical distributions that are associated with the set of transaction values. The device may generate simulated transaction information using the probabilistic transaction model. The device may perform one or more actions after generating the simulated transaction information.

20 Claims, 7 Drawing Sheets

(56) References Cited

U.S. PATENT DOCUMENTS

| | | | | |
|---|---|---|---|---|
| 6,169,981 B1* | 1/2001 | Werbos | G05B 13/0265 | 706/23 |
| 6,233,493 B1* | 5/2001 | Cherneff | G06Q 10/06 | 700/95 |
| 6,594,528 B1* | 7/2003 | Hirano | G06F 11/3006 | 700/9 |
| 6,625,569 B2* | 9/2003 | James | G05B 17/02 | 702/104 |
| 6,738,811 B1* | 5/2004 | Liang | H04L 41/147 | 709/224 |
| 6,834,266 B2* | 12/2004 | Kumar | G06Q 10/087 | 705/1.1 |
| 6,882,940 B2* | 4/2005 | Potts | A61B 5/14532 | 435/14 |
| 6,910,017 B1* | 6/2005 | Woo | G06Q 10/06 | 705/7.29 |
| 7,092,929 B1* | 8/2006 | Dvorak | G06Q 10/087 | 705/28 |
| 7,197,474 B1* | 3/2007 | Kitts | G06Q 30/02 | 705/7.31 |
| 7,251,589 B1* | 7/2007 | Crowe | G06F 17/18 | 702/181 |
| 7,263,506 B2* | 8/2007 | Lee | G06Q 20/04 | 705/318 |
| 7,310,590 B1* | 12/2007 | Bansal | G06F 11/0715 | 702/181 |
| 7,437,308 B2* | 10/2008 | Kumar | G06Q 10/087 | 705/7.33 |
| 7,523,047 B1* | 4/2009 | Neal | G06Q 30/0206 | 705/7.35 |
| 7,526,446 B2* | 4/2009 | Aguais | G06Q 40/00 | 705/35 |
| 7,580,862 B1* | 8/2009 | Montelo | G06Q 10/10 | 705/26.1 |
| 7,610,214 B1* | 10/2009 | Dwarakanath | G06Q 30/0202 | 705/7.31 |
| 7,991,663 B1 | 8/2011 | Crawford | | |
| 2001/0014868 A1* | 8/2001 | Herz | G06Q 10/0637 | 705/14.38 |
| 2002/0099597 A1* | 7/2002 | Gamage | G06Q 30/02 | 705/7.33 |
| 2002/0106709 A1* | 8/2002 | Potts | A61B 5/14532 | 435/14 |
| 2002/0123930 A1* | 9/2002 | Boyd | G06Q 30/02 | 705/14.13 |
| 2002/0133721 A1* | 9/2002 | Adjaoute | G06Q 20/04 | 726/23 |
| 2002/0147630 A1* | 10/2002 | Rose | G06Q 10/0635 | 705/7.31 |
| 2003/0018928 A1* | 1/2003 | James | G05B 17/02 | 714/25 |
| 2003/0050915 A1* | 3/2003 | Allemang | G06F 16/367 | |
| 2003/0135450 A1* | 7/2003 | Aguais | G06Q 40/00 | 705/38 |
| 2003/0212618 A1* | 11/2003 | Keyes | G06Q 30/02 | 705/35 |
| 2004/0088211 A1* | 5/2004 | Kakouros | G06Q 30/0202 | 705/7.31 |
| 2005/0256778 A1* | 11/2005 | Boyd | G06Q 30/0244 | 705/14.43 |
| 2008/0015889 A1* | 1/2008 | Fenster | G06Q 30/018 | 705/30 |
| 2009/0132347 A1* | 5/2009 | Anderson | G06Q 30/02 | 705/14.52 |
| 2010/0030544 A1* | 2/2010 | Gopalan | H04L 41/142 | 703/13 |
| 2010/0141443 A1* | 6/2010 | Romero | G01S 13/04 | 340/551 |
| 2010/0185499 A1* | 7/2010 | Dwarakanath | G06Q 10/04 | 705/7.31 |
| 2014/0214735 A1 | 7/2014 | Harik | | |

* cited by examiner

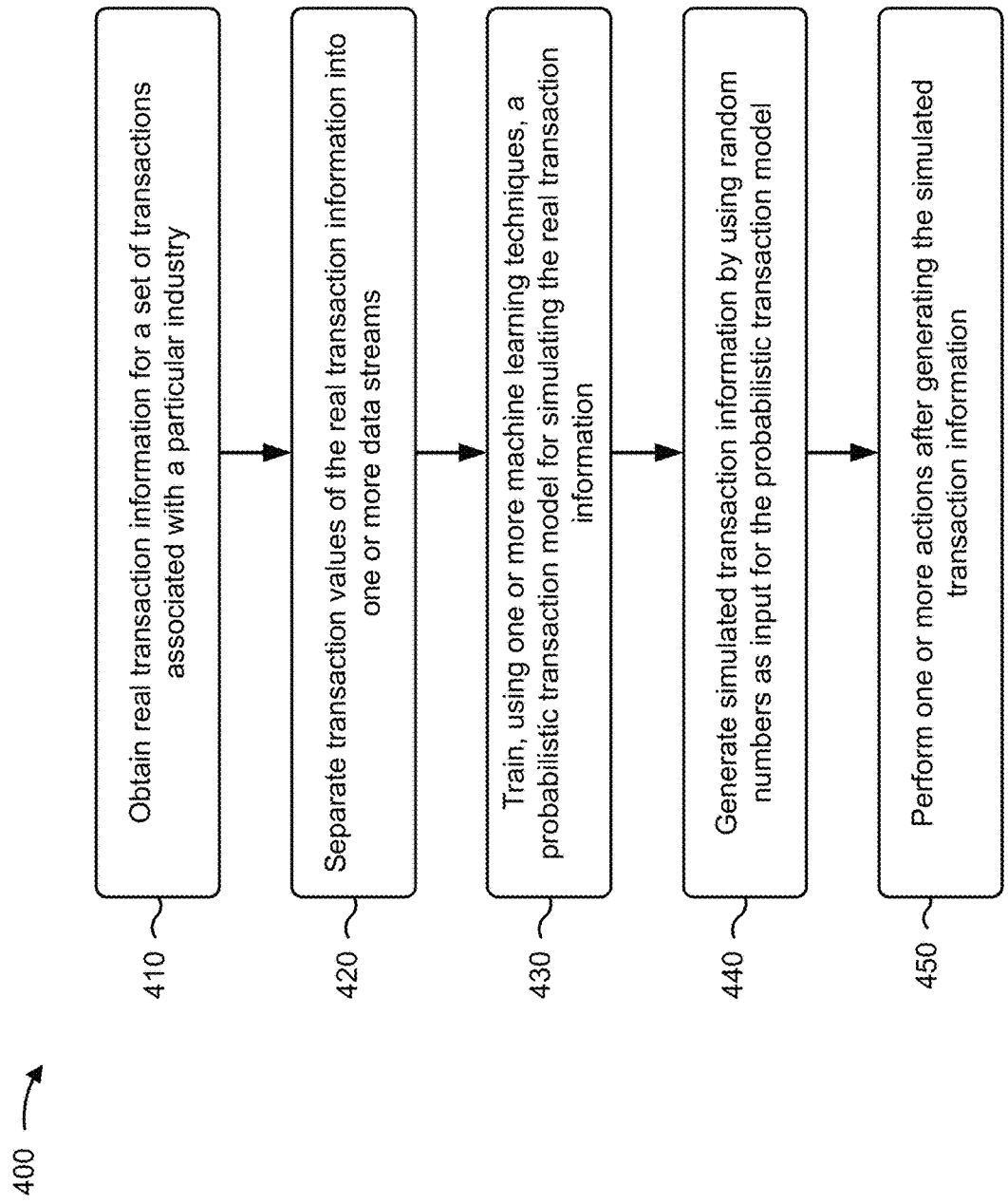

US 10,692,065 B2

USING A MIXTURE MODEL TO GENERATE SIMULATED TRANSACTION INFORMATION

BACKGROUND

Data simulation involves a process for simulating real-world transactions. For example, data simulation may use models to simulate real world transactions in a multitude of different domains and industries.

SUMMARY

According to some possible implementations, a device may include one or more processors to obtain, for a set of transactions, real transaction information associated with a particular industry. The real transaction information may include a set of transaction values. The one or more processors may separate the set of transaction values into one or more data streams based on one or more transaction data types. The set of transaction values may be associated with one or more actual statistical distributions. The device may train, using one or more machine learning techniques, a model for simulating the real transaction information. The device may generate simulated transaction information by using random numbers as input for the model. The device may perform one or more actions after generating the simulated transaction information.

According to some possible implementations, a method may include obtaining, by a device, a set of transaction values associated with a particular industry. The method may include separating, by the device, the set of transaction values into one or more data streams based on one or more transaction data types. The set of transaction values may be associated with one or more actual statistical distributions. The method may include training, by the device and by using one or more machine learning techniques, a model for simulating the real transaction information. The model may be associated with one or more sample statistical distributions that are intended to be similar to the one or more actual statistical distributions. The method may include generating, by the device, simulated transaction information by using random numbers as input for the model. The method may include performing, by the device, one or more actions after generating the simulated transaction information.

According to some possible implementations, a non-transitory computer-readable medium may store one or more instructions that, when executed by the one or more processors, cause the one or more processors to obtain, for a set of transactions, a set of transaction values associated with a particular industry. The one or more instructions may cause the one or more processors to determine one or more sample statistical distributions for a probabilistic transaction model by using one or more machine learning techniques. The one or more sample statistical distributions may be similar to one or more actual statistical distributions that are associated with the set of transaction values. The one or more instructions may cause the one or more processors to generate simulated transaction information using the probabilistic transaction model. The one or more instructions may cause the one or more processors to perform one or more actions after generating the simulated transaction information.

BRIEF DESCRIPTION OF THE DRAWINGS

FIG. 4 is a flow chart of an example process for using a model to generate simulated transaction information.

DETAILED DESCRIPTION

The following detailed description of example implementations refers to the accompanying drawings. The same reference numbers in different drawings may identify the same or similar elements.

An entity (e.g., a business, an individual, etc.) may use a data simulator to simulate real-world transactions. For example, a device of the entity may utilize a model to simulate real-world transactions between parties. However, the model may not accurately simulate real-world transactions (e.g., by generating simulation data that is not relevant or not similar to the real-world data), may not make efficient use of processing resources and/or network resources, and/or the like.

Some implementations described herein provide a transaction simulation platform that uses machine learning and probabilistic transaction models to generate simulated transaction information. For example, a transaction simulation platform may obtain real transaction information (e.g., information from actual transactions), and may train a probabilistic transaction model (e.g., a Gaussian mixture model (GMM) or Generative Adversarial Networks (GAN)) that may create simulations of the real transaction information. In this case, the transaction simulation platform may generate random numbers as input for the probabilistic transaction model to identify simulated transaction information, and may perform one or more actions associated with the simulated transaction information.

By using the probabilistic transaction model (e.g., the GMM or the GAN) to generate simulated transaction information that is similar to real transaction information, the transaction simulation platform conserves processing resources relative to devices that generate simulated transaction information that is not relevant to or not similar to the real transaction information (e.g., and may require additional resources to execute error correction techniques and/or to re-generate simulated transaction information). Furthermore, by using sample transaction values (and not actual transaction values) to train the probabilistic transaction model, the transaction simulation platform may generate simulated transaction information without jeopardizing confidential information (e.g., confidential information associated with bank transactions, credit card transactions, debit card transactions, etc.).

Figure 1A:
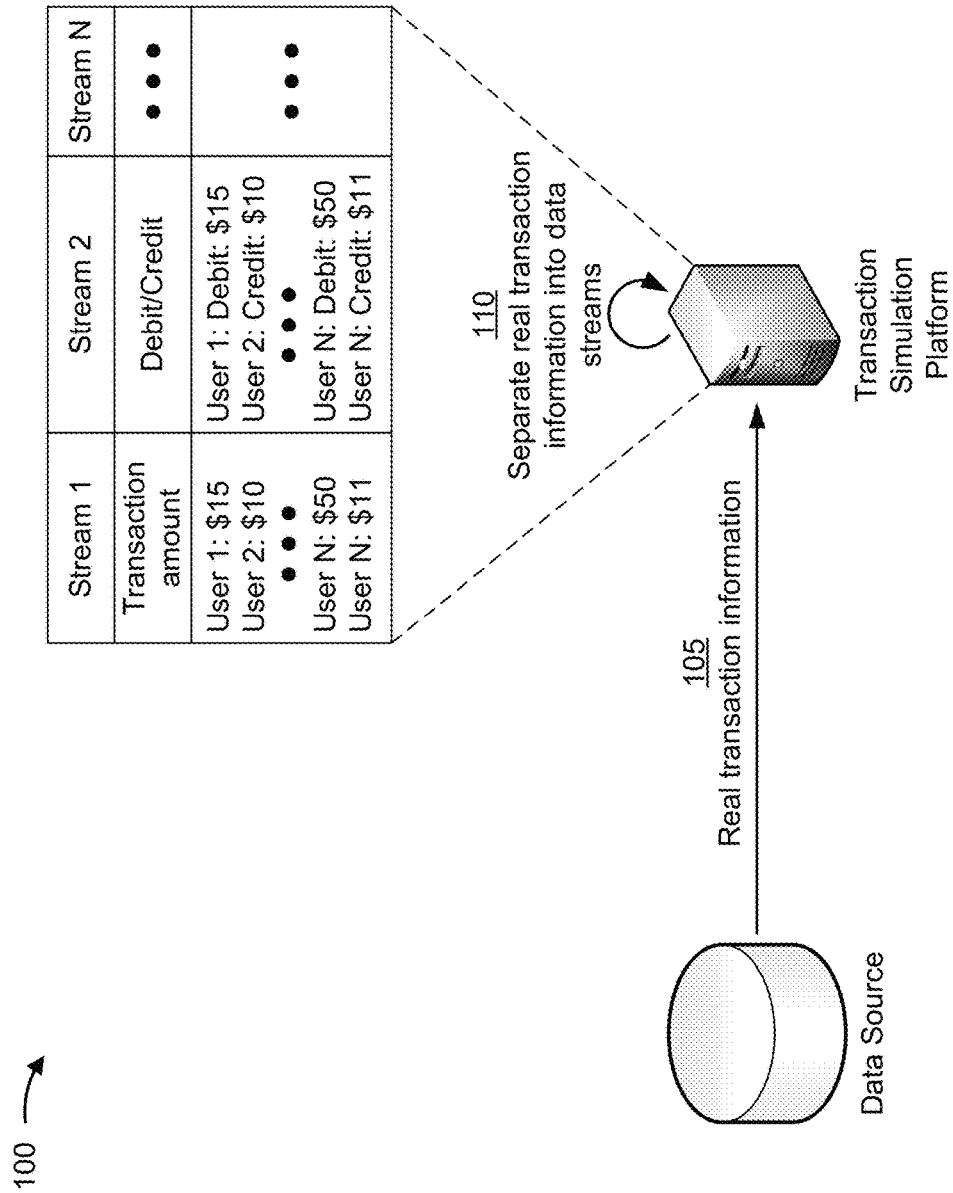
FIGS. 1A-1C are diagrams of an overview of an example implementation described herein.
Figure 1B:
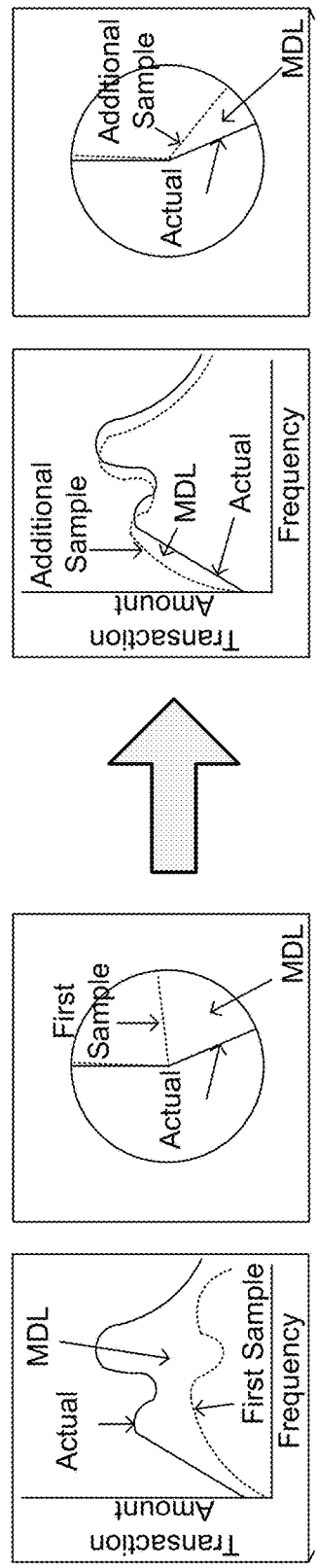
Figure 1B:
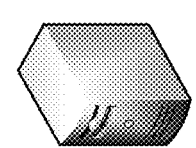
Figure 1C:
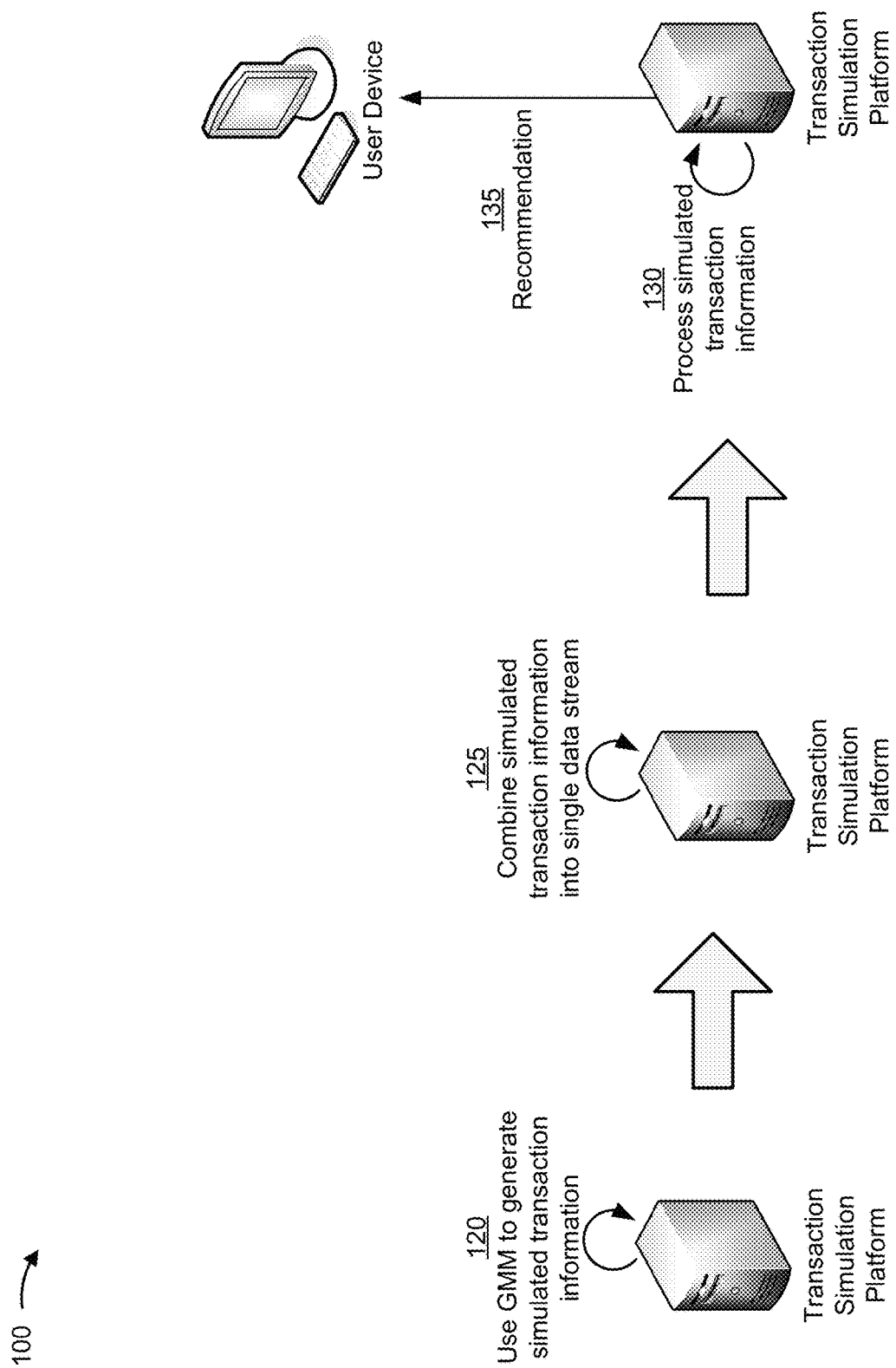

FIGS. 1A-1C are diagrams of an overview of an example implementation 100 described herein. As shown in FIGS. 1A-1C, example implementation 100 shows a transaction simulation platform generating simulated transaction information.

As shown in FIG. 1A, and by reference number 105, the transaction simulation platform may receive real transaction information from a data source. For example, the transaction simulation platform may receive real transaction information for a set of financial transactions. In this case, the real transaction information may include one or more transaction values indicating characteristics of financial transactions, such as a transaction value indicating a transaction identifier, a transaction amount, a transaction date, whether a transaction is a debit transaction or a credit transaction, a currency, an account balance before and/or after a transaction, an industry identifier, and/or the like.

As shown by reference number 110, the transaction simulation platform may separate the real transaction information into one or more data streams. For example, the transaction simulation platform may separate the real transaction information into one or more data streams using one or more transaction data types. A data stream may be a channel used to transmit or receive real transaction information associated with a particular transaction data type or with a group of data types. A transaction data type may identify a category that may be used to group similar transaction values. In this case, transaction data types for financial transactions may include a transaction amount data type, an account balance data type, a debit data type or a credit data type, a transaction type data type (e.g., a data type indicating whether a transaction is a personal transaction or a business transaction), a currency data type, and/or the like.

Shown as an example, the transaction simulation platform may separate transaction values indicating transaction amounts into a first data stream. Additionally, the transaction simulation platform may separate transaction values indicating whether a transaction is a debit transaction or a credit transaction into a second data stream. In this case, the transaction simulation platform may separate the transaction values using the transaction data types described above (e.g., the transaction amount data type, the debit data type, and the credit data type).

By separating transaction values into one or more data streams, the transaction simulation platform is able to apply one or more machine learning techniques to train a probabilistic transaction model, which may then be sampled to generate simulated transaction information, as described further herein.

As shown in FIG. 1B, and by reference number 115, the transaction simulation platform may train a probabilistic transaction model (e.g., a Gaussian Mixture Model (GMM)) that may capture statistical properties of the real transaction information. For example, the transaction simulation platform may train a probabilistic transaction model that includes a sample statistical distribution that is intended to closely resemble a statistical distribution associated with the real transaction information (referred to hereafter as the "actual" statistical distribution).

In some implementations, the transaction simulation platform may utilize one or more configuration parameters when training the probabilistic transaction model. For example, the transaction simulation platform may use one or more configuration parameters (e.g., a number of Gaussian mixtures) to approximate a sample statistical distribution of transaction amount values or to approximate a sample statistical distribution associated with the debit and credit values. The approximated sample statistical distributions may include approximations relating to a mean, a standard deviation, a weight, or the like. In some cases, a configuration parameter may be an initialized value that represents prior user knowledge relating to the transaction distribution (e.g., the knowledge of a domain expert). In other cases, a configuration parameter may be initialized using a random value.

Additionally, the transaction simulation platform may modify the one or more configuration parameters until the sample statistical distribution closely resembles the actual statistical distribution. For example, the transaction simulation platform may iteratively modify the one or more configuration parameters until the sample statistical distribution satisfies a threshold level of similarity with the actual statistical distribution. In this case, the transaction simulation platform may compare the actual statistical distribution to the sample statistical distribution to compute a mode dependent loss (MDL) value indicating the difference between the two distributions. Additionally, the transaction simulation platform may compare the MDL value to an MDL threshold value to determine whether the sample statistical distribution satisfies the threshold level of similarity with the actual statistical distribution. In this way, the one or more configuration parameters may be iteratively modified until the MDL value (i.e., the approximation criterion) satisfies the threshold.

If the sample statistical distribution does not satisfy the threshold level of similarity with the actual statistical distribution, then the transaction simulation platform may continue to modify the one or more configuration parameters and update the probabilistic transaction model. If the sample statistical distribution satisfies the threshold level of similarity with the actual statistical distribution, then the transaction simulation platform may use the current probabilistic transaction model for simulation of transactions.

By training a probabilistic transaction model that simulates the actual statistical distribution, the transaction simulation platform is able to use the model (e.g., sample the model) to generate simulated transaction information without exposing confidential transaction information to the users of the simulation platform.

As shown in FIG. 1C, and by reference number 120, the transaction simulation platform may use the probabilistic transaction model to generate simulated transaction information. For example, the transaction simulation platform may generate random numbers as input for sampling the probabilistic transaction model, and the probabilistic transaction model may output simulated transaction information. In some cases, the transaction simulation platform may store parameters approximating the real statistical distribution, and may use a random number generator to obtain a sample from the sample statistical distribution in order to generate simulated transaction information with a similar statistical distribution. In other cases, the transaction simulation platform may generate a random number (e.g., between 0 and 1) for sampling purposes, and may execute an inverse cumulative distribution function (ICDF) or the probabilistic transaction model to generate simulated transaction information, as described further herein.

As shown by reference number 125, the transaction simulation platform may combine the simulated transaction information into a single data stream. For example, the transaction simulation platform may use a multiplexer to combine the simulated transaction information associated with the one or more data streams into a single data stream. Additionally, the transaction simulation platform may standardize the simulated transaction information into a uniform file type and/or format. In this way, the transaction simulation platform may generate simulated transaction information that is in the same format as the transaction information obtained from the data source.

As shown by reference number 130, the transaction simulation platform may process the simulated transaction information. For example, the transaction simulation platform may compare the simulated transaction information and one or more user-defined parameters identifying a target statistical distribution. In this case, the transaction simulation platform may determine whether the simulated transaction information satisfies a threshold level of similarity with transaction values associated with the target statistical distribution. If the simulated transaction information satisfies a threshold level of similarity with the target statistical distribution, then the transaction simulation platform may provide, to a user device, an indication that the threshold is satisfied and/or a recommendation to perform one or more additional actions.

As shown by reference number 135, the transaction simulation platform may provide a recommendation to a user device. For example, the transaction simulation platform may provide a recommendation instructing a user associated with the user device to perform one or more additional actions based on the simulated transaction information satisfying the threshold level of similarity with the target statistical distribution.

As an example, assume the transaction simulation platform generates simulated transaction information. Further assume the transaction simulation platform is configured with user-defined parameters identifying a target statistical distribution associated with money laundering. In this case, the transaction simulation platform may determine that simulated transaction information satisfies a threshold level of similarity with transaction values associated with the target statistical distribution. Furthermore, the transaction simulation platform may provide a recommendation to the user device (e.g., a device associated with an interested party, such as a financial institution or a police department) to launch a money laundering investigation.

In this way, the transaction simulation platform is able use the simulated transaction information to make determinations relating to real-world transactions.

As indicated above, FIGS. 1A-1C are provided merely as an example. Other examples are possible and may differ from what was described with regard to FIGS. 1A-1C. For example, while implementations described herein relate to financial transactions, the transaction simulation platform may generate simulated transaction information for a number of different transactions, such as simulated transaction information for service-to-service transactions (e.g., which may not involve a transfer of funds), simulated contractual information (e.g., employment contract records), simulated transactions that are monitored by performance metrics, and/or the like.

Figure 2A:
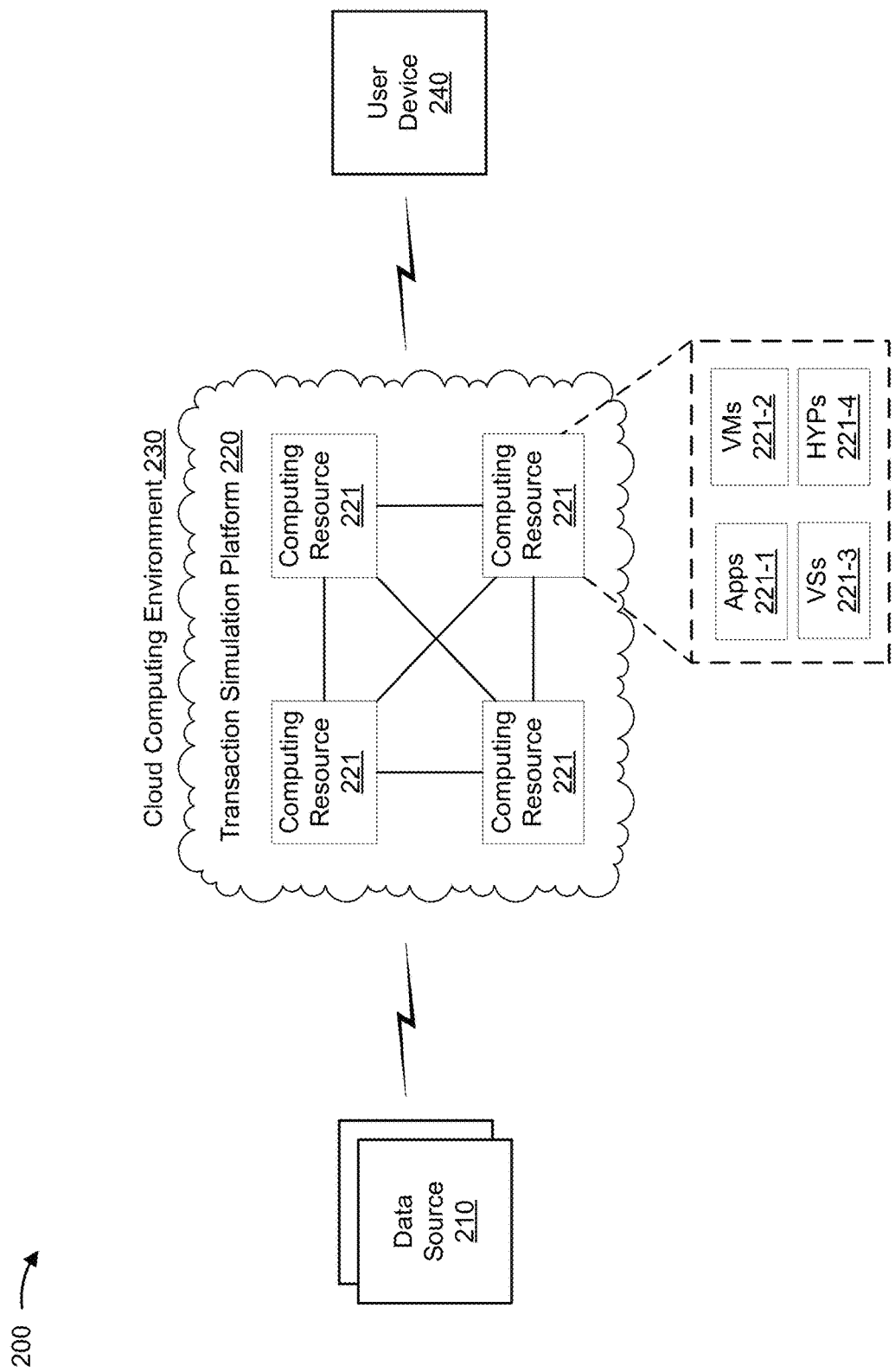
FIGS. 2A and 2B are diagrams of an example environment in which systems and/or methods, described herein, may be implemented.
Figure 2B:
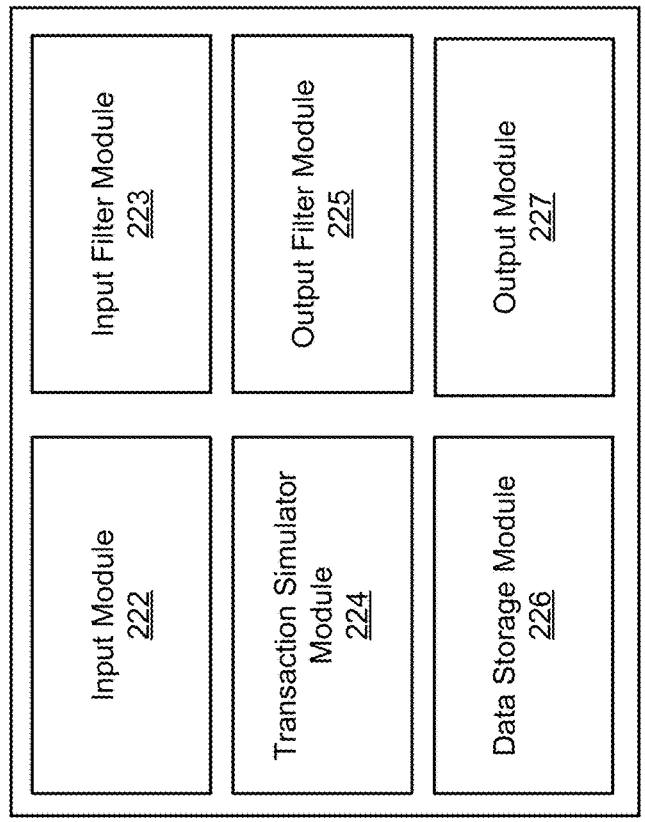

FIGS. 2A and 2B are diagrams of an example environment 200 in which systems and/or methods, described herein, may be implemented. As shown in FIG. 2A, environment 200 may include a data source 210, a transaction simulation platform 220 within a cloud computing environment 230, and a user device 240. Devices of environment 200 may interconnect via wired connections, wireless connections, or a combination of wired and wireless connections.

Data source 210 includes one or more devices capable of storing, processing, and/or providing transaction information. For example, data source 210 may include a server device or a group of server devices. In some implementations, data source 210 may store transaction information associated with a set of transactions between parties. In some implementations, data source 210 may use one or more application programming interfaces (APIs) to provide (e.g., over an encrypted channel, over a public channel, etc.) transaction information to transaction simulation platform 220.

Transaction simulation platform 220 includes one or more devices capable of obtaining, storing, generating, analyzing, and/or providing information associated with a transaction. For example, transaction simulation platform 220 may include a cloud server or a group of cloud servers. In some implementations, transaction simulation platform 220 may obtain transaction information, and may use the transaction information to train a probabilistic transaction model (e.g., a GMM, a GAN, etc.). In some implementations, transaction simulation platform 220 may generate random numbers as input for the probabilistic transaction model, and the probabilistic transaction model may output simulated transaction information. In some implementations, transaction simulation platform 220 may provide the simulated transaction information to user device 240.

In some implementations, as shown, transaction simulation platform 220 may be hosted in cloud computing environment 230. In some implementations, cloud computing environment 230 may be a private cloud computing environment. Notably, while implementations described herein describe transaction simulation platform 220 as being hosted in cloud computing environment 230, in some implementations, transaction simulation platform 220 may not be cloud-based (i.e., may be implemented outside of a cloud computing environment) or may be partially cloud-based.

Cloud computing environment 230 includes an environment that hosts transaction simulation platform 220. Cloud computing environment 230 may provide computation, software, data access, storage, and/or other services that do not require end-user knowledge of a physical location and configuration of a system and/or a device that delivers the services. As shown, cloud computing environment 230 may include a group of computing resources 221 (referred to collectively as "computing resources 221" and individually as "computing resource 221").

Computing resource 221 includes one or more personal computers, workstation computers, server devices, or another type of computation and/or communication device. In some implementations, computing resource 221 may host transaction simulation platform 220. The cloud resources may include compute instances executing in computing resource 221, storage devices provided in computing resource 221, data transfer devices provided by computing resource 221, etc. In some implementations, computing resource 221 may communicate with other computing resources 221 via wired connections, wireless connections, or a combination of wired and wireless connections.

As further shown in FIG. 2A, computing resource 221 may include a group of cloud resources, such as one or more applications ("APPs") 221-1, one or more virtual machines ("VMs") 221-2, virtualized storage ("VSs") 221-3, one or more hypervisors ("HYPs") 221-4, or the like.

Application 221-1 includes one or more software applications that may be provided to or accessed by a device associated with an interested party. Application 221-1 may eliminate a need to install and execute the software applications on a device associated with an interested party. For example, application 221-1 may include software associated with transaction simulation platform 220 and/or any other software capable of being provided via cloud computing environment 230. In some implementations, one application 221-1 may transmit/receive information to/from one or more other applications 222-1, via virtual machine 221-2.

Virtual machine 221-2 includes a software implementation of a machine (e.g., a computer) that executes programs like a physical machine. Virtual machine 221-2 may be either a system virtual machine or a process virtual machine, depending upon use and degree of correspondence to any real machine by virtual machine 221-2. A system virtual machine may provide a complete system platform that supports execution of a complete operating system ("OS"). A process virtual machine may execute a single program, and may support a single process. In some implementations, virtual machine 221-2 may execute on behalf of a user, and may manage infrastructure of cloud computing environment 230, such as data management, synchronization, or long-duration data transfers.

Virtualized storage 221-3 includes one or more storage systems and/or one or more devices that use virtualization techniques within the storage systems or devices of computing resource 221. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 221-4 provides hardware virtualization techniques that allow multiple operating systems (e.g., "guest operating systems") to execute concurrently on a host computer, such as computing resource 221. Hypervisor 221-4 may present a virtual operating platform to the guest operating systems, and may manage the execution of the guest operating systems. Multiple instances of a variety of operating systems may share virtualized hardware resources.

User device 240 includes one or more devices capable of obtaining simulated transaction information. For example, user device 240 may include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a sensor device, or a similar type of device. In some implementations, user device 240 may, using one or more APIs, obtain simulated transaction information from transaction simulation platform 220.

The number and arrangement of devices and networks shown in FIG. 2A are provided as an example. In practice, there may be additional devices, fewer devices, different devices, or differently arranged devices than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

FIG. 2B is a diagram of example functional modules of transaction simulation platform 220. As shown in FIG. 2B, transaction simulation platform 220 may include an input module 222, an input filter module 223, a transaction simulator module 224, an output filter module 225, a data storage module 226, and/or an output module 227. In some implementations, one or more modules may be implemented as part of transaction simulation platform 220. The functional modules of transaction simulation platform 220 may be implemented in hardware, software executing on hardware, and/or firmware.

Input module 222 operates on one or more computing resources 221 and is associated with obtaining and/or providing transaction information. For example, input module 222 may obtain transaction information from data source 210. In some implementations, input module 222 may use an encryption submodule to provide data encryption for communication between data source 210 and transaction simulation platform 220. In some implementations, input module 222 may obtain thousands, millions, billions, trillions, etc. of transaction values from data source 210. In some implementations, input module 222 may provide transaction information to input filter module 223.

Input filter module 223 operates on one or more computing resources 221 and is associated with receiving, processing, and/or providing transaction information. For example, input filter module 223 may receive transaction information that includes metadata identifying transaction data types, and may, based on the transaction data types, separate (e.g., demultiplex) the transaction information into one or more data streams. In some implementations, input filter module 223 may provide the transaction information to transaction simulator module 224.

Transaction simulator module 224 operates on one or more computing resources 221 and is associated with receiving and processing transaction information to generate and/or provide simulated transaction information. For example, transaction simulator module 224 may use the transaction information and one or more machine learning techniques to determine one or more sample statistical distributions. In this case, transaction simulator module 224 may use the one or more machine learning techniques and one or more configuration parameters to determine one or more sample statistical distributions for a probabilistic transaction model (e.g., a GMM). Additionally, transaction simulator module 224 may provide random numbers as input for the probabilistic transaction model, which may cause the model to output simulated transaction information. In some implementations, transaction simulator module 224 may provide the simulated transaction information to output filter module 225 and/or output module 227.

Output filter module 225 operates on one or more computing resources 221 and is associated with receiving, processing, and/or providing simulated transaction information. For example, output filter module 225 may receive simulated transaction information associated with one or more transaction data types, and may combine (e.g., multiplex) the simulated transaction information associated with the one or more transaction data types into a single data stream. In some implementations, output filter module 225 may provide simulated transaction information to data storage module 226.

Data storage module 226 operates on one or more computing resources 221 and is associated with generating a data structure for storing simulated transaction information. For example, data storage module 226 may generate a data structure, such as a graph data structure, an array, a linked-list, a tree, a hash table, and/or the like. In some implementations, data storage module 226 may store simulated transaction information in a data structure that is accessible via one or more APIs associated with output module 227.

Output module 227 operates on one or more computing resources 221 and is associated with receiving, processing, and/or providing simulated transaction information and/or information associated with simulated transaction information. In some implementations, output module 227 may provide simulated transaction information to user device 240. In some implementations, output module 227 may provide a recommendation associated with the simulated transaction information to user device 240.

The number and arrangement of devices and modules shown in FIG. 2B are provided as an example. In practice, there may be additional devices and/or modules, fewer devices and/or modules, different devices and/or modules, or differently arranged devices and/or modules than those shown in FIG. 2B. Furthermore, two or more devices and/or modules shown in FIG. 2B may be implemented within a single device, or a single device and/or a single module shown in FIG. 2B may be implemented as multiple, distributed devices and/or modules. Additionally, or alternatively, a set of devices (e.g., one or more devices) of environment 200 may perform one or more functions described as being performed by another set of devices of environment 200.

Figure 3:
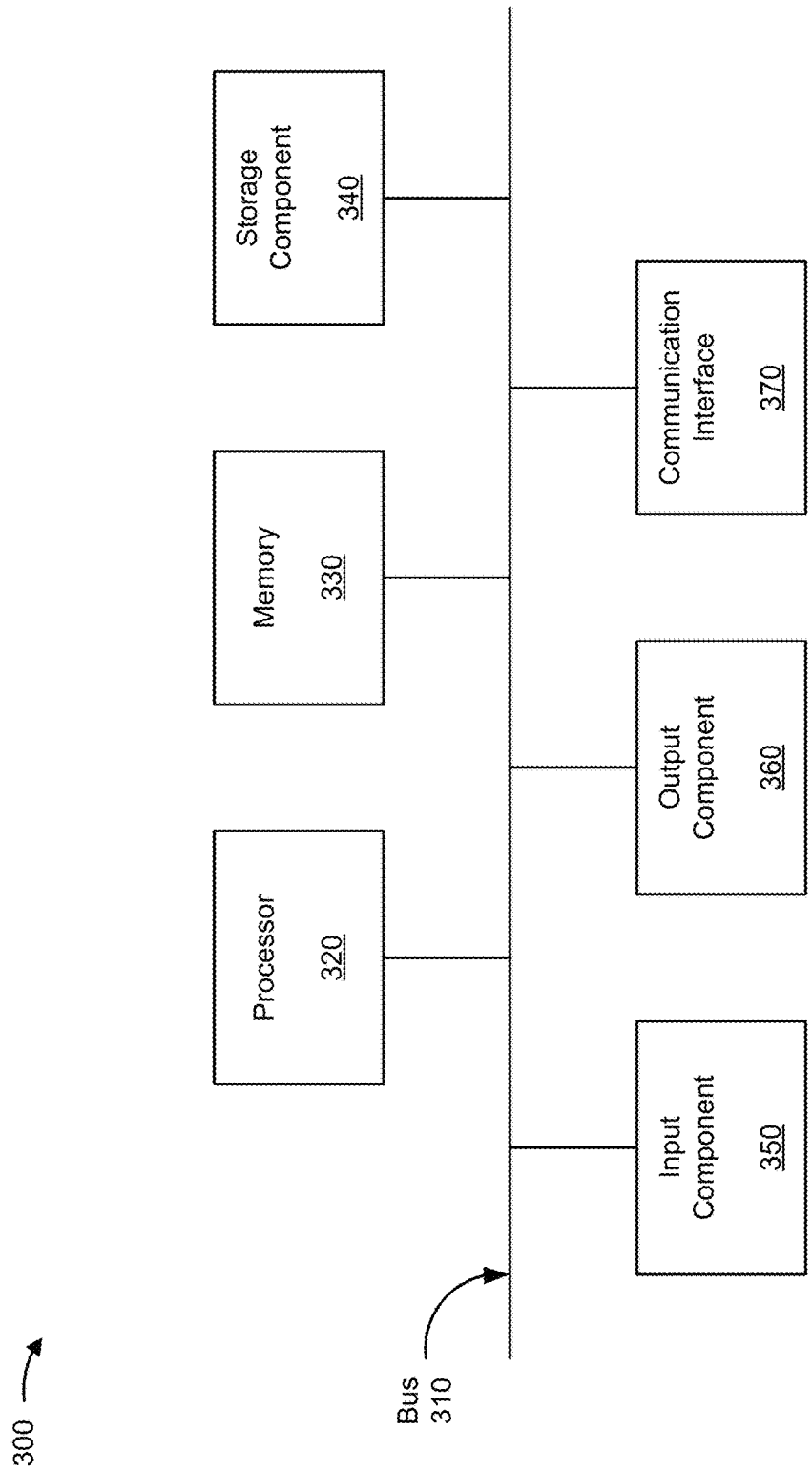
FIG. 3 is a diagram of example components of one or more devices of FIGS. 2A and 2B.

FIG. 3 is a diagram of example components of a device 300. Device 300 may correspond to data source 210, transaction simulation platform 220, and/or user device 240. In some implementations, data source 210, transaction simulation platform 220, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information. Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using a model to generate simulated transaction information. In some implementations, one or more process blocks of FIG. 4 may be performed by transaction simulation platform 220. In some implementations, one or more process blocks of FIG. 4 may be performed by another device or a group of devices separate from or including transaction simulation platform 220, such as data source 210 and/or user device 240.

As shown in FIG. 4, process 400 may include obtaining real transaction information for a set of transactions associated with a particular industry (block 410). For example, transaction simulation platform 220 may obtain, from data source 210, real transaction information for a set of transactions associated with a particular industry (e.g., an insurance industry, a retail industry, an education industry, a financial services industry, etc.). The real transaction information may include a set of transaction values indicating characteristics of a transaction.

In some implementations, data source 210 may store real transaction information. For example, data source 210 may store real transaction information using a data structure, such as a graph data structure, a linked-list, an array, a hash table, a tree, and/or the like. In some implementations, data source 210 may use a data structure that includes thousands, tens of thousands, hundreds of thousands, or even millions (or more) of data points. In this way, data source 210 is able to store large quantities of data that transaction simulation platform 220 may obtain for further processing. Additionally, the large quantities of data may be such that a human operator or an inferior data simulation service may be unable to objectively analyze or process.

In some implementations, transaction simulation platform 220 may obtain real transaction information from data source 210. For example, transaction simulation platform 220 may obtain financial transaction information for a set of entities engaging in a set of transactions associated with a particular industry. The financial transaction information may include a set of transaction values, such as a value indicating an identifier of an entity involved in a financial transaction, a value indicating a transaction identifier, a transaction amount, a transaction date, an account balance before or after a transaction, whether a transaction is a debit transaction or a credit transaction, a currency used in a transaction, a sender account balance before and/or after a transaction, a receiver account balance before and/or after a transaction, a transaction type (e.g., a personal transaction, a business transaction, etc.), an industry identifier, and/or the like.

In some implementations, transaction simulation platform 220 may obtain encrypted real transaction information. For example, transaction simulation platform 220 may obtain encrypted real transaction information over a secure channel, and may decrypt the real transaction information for further processing. In this case, transaction simulation platform 220 may utilize public key encryption, private key encryption, hashing, and/or the like.

In this way, transaction simulation platform 220 may obtain real transaction information that may be further processed to generate simulated transaction information, as described further herein.

As further shown in FIG. 4, process 400 may include separating transaction values of the real transaction information into one or more data streams (block 420). For example, transaction simulation platform 220 may use one or more transaction data types to separate transaction values into one or more data streams. A data stream may be a channel used to transmit or receive real transaction information associated with a particular transaction data type or with a group of data types. A transaction data type may identify a category that may be used to group similar transaction values. For example, transaction data types for a financial transaction may include a transaction amount data type, an account balance data type (e.g., a balance before a transaction, a balance after a transaction, etc.), a debit data type or a credit data type, a transaction type data type (e.g., a transaction may be a personal transaction or a business transaction), a currency data type, and/or the like.

In some implementations, transaction simulation platform 220 may separate transaction values based on transaction data types. For example, transaction simulation platform 220 may identify transaction data types associated with transaction values, and may separate (e.g., using a demultiplexer) the transaction values based on the data types. As an example, assume the real transaction information includes a first transaction value indicating a transaction amount and a second transaction value indicating a currency used for the transaction. In this case, transaction simulation platform 220 may separate the first transaction value into a first data stream associated with transaction amount data types, and may separate the second transaction value into a second data stream associated with currency data types.

In some implementations, transaction simulation platform 220 may combine transaction values of different data types into an aggregated data stream. For example, transaction simulation platform 220 may combine transition values of different data types into a aggregated data stream if the data types are related or may need to be processed together. As an example, transaction simulation platform 220 may combine a transaction value associated with a debit type and a transaction value associated with a credit type into the same data stream, thereby allowing transaction simulation platform 220 to subsequently process the transaction values together. As another example, transaction simulation platform 220 may combine a transaction value associated with a transaction amount and a transaction value associated with a corresponding transaction date into the same data stream. In this way, transaction simulation platform 220 may combine transaction values of different data types into aggregated data streams to allow the transaction values to be processed together.

In some implementations, transaction simulation platform 220 may filter the transaction information by removing transaction values that do not need to be processed. For example, transaction simulation platform 220 may use a filtering technique to filter out transaction values that are not relevant for any of the available data streams (e.g., a transaction value may be too old or may have a transaction data type that transaction simulation platform 220 is not analyzing). In this way, transaction simulation platform 220 conserves processing resources relative to filtering transaction values that are not relevant for generating simulated transaction information.

By separating transaction values into one or more data streams, transaction simulation platform 220 is able to apply one or more machine learning techniques to train a probabilistic transaction model, which may be sampled to generate simulated transaction information, as described further herein.

As further shown in FIG. 4, process 400 may include training, using one or more machine learning techniques, a probabilistic transaction model for simulating the real transaction information (block 430). For example, transaction simulation platform 220 may train a probabilistic transaction model (e.g., a generative model, such as a Gaussian Mixture Model (GMM), a generative adversarial network (GAN), etc.) to capture statistical properties of the real transaction information. In this case, the probabilistic transaction model may approximate a sample statistical distribution that is intended to closely resemble a statistical distribution associated with the real transaction information (referred to herein as the actual statistical distribution).

In some implementations, transaction simulation platform 220 may use a machine learning technique to train a probabilistic transaction model. For example, transaction simulation platform 220 may train a probabilistic transaction model using one or more configuration parameters. A configuration parameter (e.g., a Gaussian mixture) may be used to approximate a sample statistical distribution, and may include a value indicating a mean, a standard deviation, a weight, and/or the like. In this case, transaction simulation platform 220 may use machine learning to iteratively modify configuration parameters until the sample statistical distribution satisfies a threshold level of similarity with the actual statistical distribution.

In some cases, transaction simulation platform 220 may rely on a domain expert to select initial configuration parameters. By using the knowledge of a domain expert to select initial configuration parameters that approximate a sample statistical distribution that is similar to the actual statistical distribution, transaction simulation platform 220 conserves processing resources by reducing a number of iterations that the configuration parameters may need to be modified to closely resemble the actual statistical distribution. In other cases, transaction simulation platform 220 may generate random values as the one or more configuration parameters, and may implement machine learning without any human intervention.

Additionally, transaction simulation platform 220 may modify the one or more configuration parameters until the sample statistical distribution closely resembles (is similar to) the actual statistical distribution. For example, transaction simulation platform 220 may iteratively modify the one or more configuration parameters until the sample statistical distribution satisfies a threshold level of similarity with the actual statistical distribution. In this case, transaction simulation platform 220 may compare the actual statistical distribution to the sample statistical distribution to compute a mode dependent loss (MDL) value indicating the difference between the two distributions. Additionally, transaction simulation platform 220 may compare the MDL value to a threshold value to determine whether the sample statistical distribution satisfies the threshold level of similarity with the actual statistical distribution. In this way, the one or more configuration parameters may be iteratively modified until the MDL value (i.e., the approximation criterion) satisfies the threshold.

If the sample statistical distribution does not satisfy the threshold level of similarity with the actual statistical distribution, then transaction simulation platform 220 may continue to modify the one or more configuration parameters and update the probabilistic transaction model. If the sample statistical distribution satisfies the threshold level of similarity with the actual statistical distribution, then transaction simulation platform 220 may use the current probabilistic transaction model for simulation of transactions.

In some implementations, transaction simulation platform 220 may train a GMM using an expectation maximization technique. For example, transaction simulation platform 220 may use one or more configuration parameters to approximate an initial sample statistical distribution, and may use an expectation maximization technique to approximate one or more additional sample statistical distributions until an additional sample statistical distribution satisfies a threshold level of similarity with an actual statistical distribution. In this case, the expectation maximization technique may involve an expectation step and a maximization step. As an example, transaction simulation platform 220 may execute the expectation step based on the following formula:

$$P(X|\theta) = \sum_{i=0}^{k} w_i N_i(\mu_i; \sigma_i) \quad (1)$$

In equation 1, $P(X|\theta)$ may represent a probability of a sample statistical distribution $\theta$ given a set of transaction values $X$ ($x_i$ to $x_n$). The term k may represent a number of Gaussian mixture components (e.g., transaction values associated with the original transaction information). The term $\mu_i$ may represent a mean of a sample statistical distribution. The term $N_i$ may represent a normal Gaussian distribution. The term $\sigma_i$ may represent a variance of a sample statistical distribution. The term $w_i$ may represent a Gaussian mixture weight. The purpose of equation 1 is to determine a probability of a transaction value ($x_i$) being equal to or similar to a Gaussian mixture component.

Additionally, transaction simulation platform 220 may execute the maximization step. For example, transaction simulation platform 220 may execute the maximization step by generating additional values associated with an additional mean, an additional variance, one or more additional weights, and/or the like, and may compare the additional values (which combine to form the sample statistical distribution) to transaction values associated with the actual statistical distribution to determine a mode dependent loss (MDL) value. In this case, transaction simulation platform 220 may compare the MDL value to a threshold value to determine whether the additional values satisfy a threshold level of similarity with the transaction values associated with the actual statistical distribution. If the threshold level of similarity is satisfied, then transaction simulation platform 220 may identify the additional values as the sample statistical distribution to be used for the GMM. If the threshold is not satisfied, then transaction simulation platform 220 may continue to modify (e.g., increase or decrease) the additional values until the threshold is satisfied.

In some implementations, transaction simulation platform 220 may determine a sample statistical distribution using a probabilistic transaction model other than a GMM. For example, transaction simulation platform 220 may determine a sample statistical distribution using another type of mixture model, such as a GAN, a mixture density model, a probability mixture model, a flexible mixture model, and/or the like.

In some implementations, transaction simulation platform 220 may determine a sample statistical distribution for a single data stream. In some implementations, transaction simulation platform 220 may determine a sample statistical distribution that is associated with multiple data streams (i.e., multiple transaction data types).

By determining sample statistical distributions that are similar to the actual statistical distributions, transaction simulation platform 220 is able to train a probabilistic transaction model with relevant information without exposing confidential transaction information.

As further shown in FIG. 4, process 400 may include generating simulated transaction information by using random numbers as input for the probabilistic transaction model (block 440). For example, transaction simulation platform 220 may provide random numbers as input for sampling the probabilistic transaction model (e.g., the GMM), and the probabilistic transaction model may process the random numbers to output simulated transaction information.

In some implementations, transaction simulation platform 220 may generate simulated transaction information using a set of sample transaction values associated with the sample statistical distribution. For example, transaction simulation platform 220 may store sample transaction values associated with a sample statistical distribution in a list (e.g., an array, a linked-list, a dictionary, etc.), and may use a random number generator to select a set of sample transaction values from the list. In this case, transaction simulation platform 220 may use the selected set of sample transaction values as the simulated transaction information.

In some implementations, transaction simulation platform 220 may generate simulated transaction information by using an inverse cumulative distribution function (ICDF). For example, assume transaction simulation platform 220 uses the probabilistic transaction model to determine a sample statistical distribution. Further assume transaction simulation platform 220 generates a random number (e.g., between 0 and 1). Additionally, transaction simulation platform 220 may associate Gaussian weight values (which are between 0 and 1) of the sample statistical distribution with the random numbers. In this case, transaction simulation platform 220 may execute an ICDF to generate an inverse of the sample statistical distribution, and may select sample transaction values that are within the inverse sample statistical distribution. Furthermore, transaction simulation platform 220 may use the selected sample transaction values as simulated transaction values.

In some implementations, transaction simulation platform 220 may generate simulated transaction information for non-numerical data types. For example, assume transaction simulation platform 220 receives transaction information associated with a non-numerical data type (e.g., transaction values associated with a transaction type parameter). Further assume that transaction simulation platform 220 determines a sample statistical distribution associated with the non-numerical data type by determining a ratio indicating a distribution of the non-numerical data. In this case, transaction simulation platform 220 may generate an amount of sample transaction values needed to reach the particular ratio indicating the distribution of the non-numerical data. Additionally, transaction simulation platform 220 may generate simulated transaction information by randomly selecting sample transaction values and using the selected sample transaction values as the simulated transaction information.

In this way, transaction simulation platform 220 generates simulated transaction information that may be combined, stored, processed, provided to an interested party, and/or the like.

As further shown in FIG. 4, process 400 may include performing one or more actions after generating the simulated transaction information (block 450). For example, transaction simulation platform 220 may combine the simulated transaction information, store the simulated transaction information, process the simulated transaction information (e.g., to detect an anomaly relating to the real transaction information), provide the simulated transaction information or a recommendation associated with the simulated transaction information to an interested party, and/or the like.

In some implementations, transaction simulation platform 220 may combine the simulated transaction information. For example, transaction simulation platform 220 may, using a multiplexer, combine simulated transaction information for the one or more data streams into a single data stream. Additionally, transaction simulation platform 220 may standardize the simulated transaction information into a uniform file type and/or format. In this way, transaction simulation platform 220 may generate simulated transaction information that is similar to the transaction information obtained from data source 210.

In some implementations, transaction simulation platform 220 may store the simulated transaction information. For example, transaction simulation platform 220 may store the simulated transaction information using a data structure that is accessible via one or more APIs. In this case, the simulated transaction information may be stored in a manner that allows a device associated with an interested party (e.g., user device 240) to query the simulated transaction information.

In some implementations, transaction simulation platform 220 may provide the simulated transaction information to user device 240. For example, transaction simulation platform 220 may provide simulated transaction information as a response to a request by user device 240, may be configured to automatically provide simulated transaction information to user device 240, and/or the like. In some cases, transaction simulation platform 220 may receive a request for a subset of the simulated transaction information, and may provide the subset of the simulated transaction information to user device 240.

In some implementations, transaction simulation platform 220 may process the simulated transaction information to detect an anomaly relating to the real transaction information. For example, transaction simulation platform 220 may generate simulated transaction information that has a particular statistical distribution. In some cases, a particular statistical distribution may be indicative of an anomaly, such as a threshold deviation from an expected statistical distribution. As an example, an expected statistical distribution for a financial transaction may resemble legal financial transactions, whereas a deviation from the expected statistical distribution (e.g., the anomaly) may be associated with a particular statistical distribution that resembles a money laundering transaction.

In some implementations, transaction simulation platform 220 may process the simulated transaction information by executing a training procedure and/or a testing procedure. For example, transaction simulation platform 220 may perform a training procedure and/or a testing procedure, and may provide a recommendation to an interested party based on a result of the procedure(s). As an example, transaction simulation platform 220 may perform a testing procedure that includes comparing the simulated transaction information to one or more user-defined parameters identifying a target statistical distribution. In this case, transaction simulation platform 220 may determine whether the simulated transaction information satisfies a threshold level of similarity with transaction values associated with the target statistical distribution. If the simulated transaction information satisfies a threshold level of similarity with the target statistical distribution, then transaction simulation platform 220 may provide, to user device 240, an indication that the threshold is satisfied or a recommendation to perform one or more additional actions.

As a specific example, assume transaction simulation platform 220 is configured with user-defined parameters identifying a target statistical distribution associated with money laundering. In this case, transaction simulation platform 220 may determine that simulated transaction information satisfies a threshold level of similarity with transaction values associated with the target statistical distribution. Additionally, transaction simulation platform 220 may provide a recommendation to a device associated with an interested party (e.g., a financial institution, a government official, etc.) to launch a money laundering investigation.

In this way, transaction simulation platform 220 is able to filter, store, and/or process the simulated transaction information, and may provide the simulated transaction information to an interested party.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using a probabilistic transaction model (e.g., a GMM) to generate simulated transaction information that is similar to real-world transaction information, transaction simulation platform 220 conserves processing resources relative to devices that generate transaction information that is not relevant to or not similar to the real-world transaction information (e.g., and may require additional resources to execute error correction techniques and/or to re-generate simulated transaction information). Furthermore, by using sample transaction values (and not actual transaction values) to train the probabilistic transaction model, the transaction simulation platform may generate simulated transaction information without jeopardizing confidential information (e.g., confidential information associated with bank transactions).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, for a set of transactions, real transaction information associated with a particular industry,
the real transaction information including a set of transaction values;
separate the set of transaction values into one or more data streams based on one or more transaction data types,
the set of transaction values being associated with one or more actual statistical distributions,
a first set of transaction values, of the set of transaction values, being associated with transaction amounts,
the first set of transaction values being separated into a first data stream, and
a second set of transaction values, of the set of transaction values, being associated with a debit transaction or a credit transaction,
the second set of transaction values being separated into a second data stream;
train, using one or more machine learning techniques, a model for simulating the real transaction information;
generate simulated transaction information by using random numbers as input for the model;
process the simulated transaction information to detect an anomaly relating to the real transaction information after generating the simulated transaction information;
cause at least one of a training procedure or a testing procedure to be executed based on detecting the anomaly; and
provide a recommendation to an entity based on one of:
a result of the training procedure if the training procedure is caused to be executed, or
a result of the testing procedure if the testing procedure is caused to be executed.

2. The device of claim 1, where the real transaction information is financial transaction information and the set of transaction values include at least one of:
a value indicating an identifier of an entity involved in a financial transaction,
a value indicating a transaction identifier,
a value indicating a transaction amount of the transaction amounts,
a value indicating a transaction date,
a value indicating an account balance,
a value indicating whether a transaction is a debit transaction or a credit transaction,
a value indicating a currency used in a transaction,
a value indicating a transaction type, or
some combination thereof.

3. The device of claim 1, where the one or more transaction data types are associated with financial transactions and include at least one of:
a transaction amount data type,
an account balance data type,
a debit data type,
a credit data type,
a currency data type,
a transaction type data type, or
some combination thereof.

4. The device of claim 1, where the one or more processors, when separating the set of transaction values into the one or more data streams, are to:
identify, for the set of transaction values, the one or more transaction data types, and
separate the set of transaction values into the one or more data streams,
where a transaction value of the set of transaction values is separated into a data stream, of the one or more data streams, based on a transaction data type of the one or more transaction data types.

5. The device of claim 1, where the one or more processors, when training the model, are to:
train the model using one or more configurations parameters,
the one or more configuration parameters being associated with one or more sample statistical distributions that are intended to closely resemble the one or more actual statistical distributions.

6. The device of claim 5, where the model is a Gaussian Mixture Model (GMM); and where the one or more processors, when training the GMM, are to:
determine a first sample statistical distribution of the one or more sample statistical distributions using the one or more configuration parameters, determine that the first sample statistical distribution does not satisfy a threshold level of similarity with an actual statistical distribution of the one or more actual statistical distributions, determine a second sample statistical distribution by modifying the one or more configuration parameters based on determining that the first sample statistical distribution does not satisfy the threshold level of similarity with the actual statistical distribution, determine that the second sample statistical distribution satisfies the threshold level of similarity with the actual statistical distribution, and identify the second sample statistical distribution as the sample statistical distribution to be used for the GMM.

7. The device of claim 1, where the one or more processors, when generating the simulated transaction information, are to:

provide the random numbers as input for the model, and
generate the simulated transaction information using an inverse cumulative distribution function (ICDF).

8. A method, comprising:

receiving, by a device and for a set of transactions, real transaction information associated with a particular industry,
the real transaction information including a set of transaction values;

separating, by the device, the set of transaction values into one or more data streams based on one or more transaction data types,
the set of transaction values being associated with one or more actual statistical distributions,
a first set of transaction values, of the set of transaction values, being associated with transaction amounts,
the first set of transaction values being separated into a first data stream, and
a second set of transaction values, of the set of transaction values, being associated with a debit transaction or a credit transaction,
the second set of transaction values being separated into a second data stream;

training, by the device and using one or more machine learning techniques, a model for simulating the real transaction information;

generating, by the device, simulated transaction information by using random numbers as input for the model;

processing, by the device, the simulated transaction information to detect an anomaly relating to the real transaction information after generating the simulated transaction information;

causing, by the device, at least one of a training procedure or a testing procedure to be executed based on detecting the anomaly; and providing, by the device, a recommendation to an entity based on one of:
a result of the training procedure if the training procedure is caused to be executed, or
a result of the testing procedure if the testing procedure is caused to be executed.

9. The method of claim 8, where the real transaction information is financial transaction information and the set of transaction values include at least one of:

a value indicating an identifier of an entity involved in a financial transaction,
a value indicating a transaction identifier,
a value indicating a transaction amount of the transaction amounts,
a value indicating a transaction date,
a value indicating an account balance,
a value indicating whether a transaction is a debit transaction or a credit transaction,
a value indicating a currency used in a transaction,
a value indicating a transaction type, or
some combination thereof.

10. The method of claim 8, where the one or more transaction data types are associated with financial transactions and include at least one of:

a transaction amount data type,
an account balance data type,
a debit data type,
a credit data type,
a currency data type,
a transaction type data type, or
some combination thereof.

11. The method of claim 8, where separating the set of transaction values into the one or more data streams comprises:

identifying, for the set of transaction values, the one or more transaction data types, and
separating the set of transaction values into the one or more data streams,
where a transaction value of the set of transaction values is separated into a data stream, of the one or more data streams, based on a transaction data type of the one or more transaction data types.

12. The method of claim 8, where training the model comprises:

train the model using one or more configurations parameters,
the one or more configuration parameters being associated with one or more sample statistical distributions that are intended to closely resemble the one or more actual statistical distributions.

13. The method of claim 12, where the model is a Gaussian Mixture Model (GMM); and where training the GMM comprises:

determining a first sample statistical distribution of the one or more sample statistical distributions using the one or more configuration parameters,
determining that the first sample statistical distribution does not satisfy a threshold level of similarity with an actual statistical distribution of the one or more actual statistical distributions,
determining a second sample statistical distribution by modifying the one or more configuration parameters based on determining that the first sample statistical distribution does not satisfy the threshold level of similarity with the actual statistical distribution,
determining that the second sample statistical distribution satisfies the threshold level of similarity with the actual statistical distribution, and
identifying the second sample statistical distribution as the sample statistical distribution to be used for the GMM.

14. The method of claim 8, where generating the simulated transaction information comprises:

provide the random numbers as input for the model, and
generate the simulated transaction information using an inverse cumulative distribution function (ICDF).

15. A non-transitory computer-readable medium storing instructions, the instructions comprising:

one or more instructions, when executed by one or more processors, cause the one or more processors to:

receive, for a set of transactions, real transaction information associated with a particular industry,
  the real transaction information including a set of transaction values;
separate the set of transaction values into one or more data streams based on one or more transaction data types,
  the set of transaction values being associated with one or more actual statistical distributions,
  a first set of transaction values, of the set of transaction values, being associated with transaction amounts,
    the first set of transaction values being separated into a first data stream, and
  a second set of transaction values, of the set of transaction values, being associated with a debit transaction or a credit transaction,
    the second set of transaction values being separated into a second data stream;
train, using one or more machine learning techniques, a model for simulating the real transaction information;
generate simulated transaction information by using random numbers as input for the model;
process the simulated transaction information to detect an anomaly relating to the real transaction information after generating the simulated transaction information;
cause at least one of a training procedure or a testing procedure to be executed based on detecting the anomaly; and
provide a recommendation to an entity based on one of:
  a result of the training procedure if the training procedure is caused to be executed, or
  a result of the testing procedure if the testing procedure is caused to be executed;
where the model is a Gaussian Mixture Model (GMM); and where the one or more processors, when training the GMM, are to:
  determine a first sample statistical distribution of one or more sample statistical distributions using one or more configuration parameters,
  determine that the first sample statistical distribution does not satisfy a threshold level of similarity with an actual statistical distribution of the one or more actual statistical distributions,
  determine a second sample statistical distribution by modifying the one or more configuration parameters based on determining that the first sample statistical distribution does not satisfy the threshold level of similarity with the actual statistical distribution,
  determine that the second sample statistical distribution satisfies the threshold level of similarity with the actual statistical distribution, and
  identify the second sample statistical distribution as the sample statistical distribution to be used for the GMM.

16. The non-transitory computer-readable medium of claim 15, where the real transaction information is financial transaction information and the set of transaction values include at least one of:
  a value indicating an identifier of an entity involved in a financial transaction,
  a value indicating a transaction identifier,
  a value indicating a transaction amount of the transaction amounts,
  a value indicating a transaction date,
  a value indicating an account balance,
  a value indicating whether a transaction is a debit transaction or a credit transaction,
  a value indicating a currency used in a transaction,
  a value indicating a transaction type, or
  some combination thereof.

17. The non-transitory computer-readable medium of claim 15, where the one or more transaction data types are associated with financial transactions and include at least one of:
  a transaction amount data type,
  an account balance data type,
  a debit data type,
  a credit data type,
  a currency data type,
  a transaction type data type, or
  some combination thereof.

18. The non-transitory computer-readable medium of claim 15, where the one or more instructions, that cause the one or more processors to separate the set of transaction values into the one or more data streams, cause the one or more processors to:
  identify, for the set of transaction values, the one or more transaction data types, and
  separate the set of transaction values into the one or more data streams,
    where a transaction value of the set of transaction values is separated into a data stream, of the one or more data streams, based on a transaction data type of the one or more transaction data types.

19. The non-transitory computer-readable medium of claim 15, where the one or more instructions, that cause the one or more processors to train the model, cause the one or more processors to:
  train the model using the one or more configurations parameters,
    the one or more configuration parameters being associated with the one or more sample statistical distributions that are intended to closely resemble the one or more actual statistical distributions.

20. The non-transitory computer-readable medium of claim 15, where the one or more instructions, that cause the one or more processors to generate the simulated transaction information, cause the one or more processors to:
  provide the random numbers as input for the model, and
  generate the simulated transaction information using an inverse cumulative distribution function (ICDF).

* * * * *